United States Patent
Mate et al.

(10) Patent No.: US 10,785,565 B2
(45) Date of Patent: Sep. 22, 2020

(54) DISTRIBUTED AUDIO CAPTURE AND MIXING CONTROLLING

(71) Applicant: Nokia Technologies Oy, Espoo (FI)

(72) Inventors: Sujeet Shyamsundar Mate, Tampere (FI); Jussi Leppanen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/461,030

(22) PCT Filed: Nov. 10, 2017

(86) PCT No.: PCT/FI2017/050780
§ 371 (c)(1),
(2) Date: May 15, 2019

(87) PCT Pub. No.: WO2018/091777
PCT Pub. Date: May 24, 2018

(65) Prior Publication Data
US 2019/0349677 A1      Nov. 14, 2019

(30) Foreign Application Priority Data

Nov. 16, 2016    (GB) .................................. 1619389.8

(51) Int. Cl.
*H04R 3/00*    (2006.01)
*H04R 25/00*   (2006.01)
(Continued)

(52) U.S. Cl.
CPC ............. *H04R 3/005* (2013.01); *H04R 1/406* (2013.01); *G01S 1/02* (2013.01); *G01S 19/53* (2013.01)

(58) Field of Classification Search
CPC ...... H04R 3/005; H04R 5/027; H04R 25/407; G01S 1/80; G10L 2021/02166;
(Continued)

(56) References Cited

U.S. PATENT DOCUMENTS

2005/0002535 A1    1/2005    Liu et al.
2009/0073950 A1    3/2009    Guccione et al.
(Continued)

FOREIGN PATENT DOCUMENTS

EP    1 390 942    12/2002
EP    1 621 017    11/2004
(Continued)

*Primary Examiner* — Paul Kim
*Assistant Examiner* — Ubachukwu A Odunukwe
(74) *Attorney, Agent, or Firm* — Harrington & Smith

(57) ABSTRACT

Apparatus including a processor configured to: receive an audio signal from a close microphone, wherein the audio signal is input in a spatial audio mixing, and the close microphone is associated with a first sound source; receive a beam-formed audio signal from a microphone array, wherein the beam-formed audio signal is a result of forming a beam of the microphone array directed from the microphone array towards the close microphone so as to enhance the audio signal; determine a time duration where no further sound source is active within the sound scene the first sound source; and determine a time difference, during the time duration, between the audio signal and the beam-formed audio signal to enable alignment of the audio signal and the beam-formed audio signal.

20 Claims, 15 Drawing Sheets

(51) Int. Cl.
*G10L 21/0216* (2013.01)
*H04S 7/00* (2006.01)
*H04R 1/40* (2006.01)
*G01S 1/02* (2010.01)
*G01S 19/53* (2010.01)

(58) Field of Classification Search
CPC ......... G10L 15/04; G10L 25/87; H04S 7/303; H04M 3/568
USPC .............................................. 381/56, 58, 92
See application file for complete search history.

(56) References Cited

U.S. PATENT DOCUMENTS

| | | | |
|---|---|---|---|
| 2010/0150360 A1 | 6/2010 | Beaucoup | |
| 2012/0155703 A1 | 6/2012 | Hernandez-Abrego et al. | |
| 2013/0077805 A1* | 3/2013 | Kirsch | G11B 27/105 381/119 |
| 2015/0310869 A1 | 10/2015 | Ojanpera et al. | |
| 2016/0021477 A1 | 1/2016 | Hiipakka et al. | |
| 2017/0026740 A1* | 1/2017 | Kirsch | H04R 1/406 |
| 2018/0350405 A1* | 12/2018 | Marco | G11B 27/031 |

FOREIGN PATENT DOCUMENTS

| | | |
|---|---|---|
| EP | 1 571 875 A2 | 9/2005 |
| EP | 2 352 290 A1 | 8/2011 |
| EP | 2827610 A2 | 1/2015 |
| WO | WO-2013088208 A1 | 6/2013 |
| WO | WO 2017/064367 A1 | 4/2017 |

\* cited by examiner

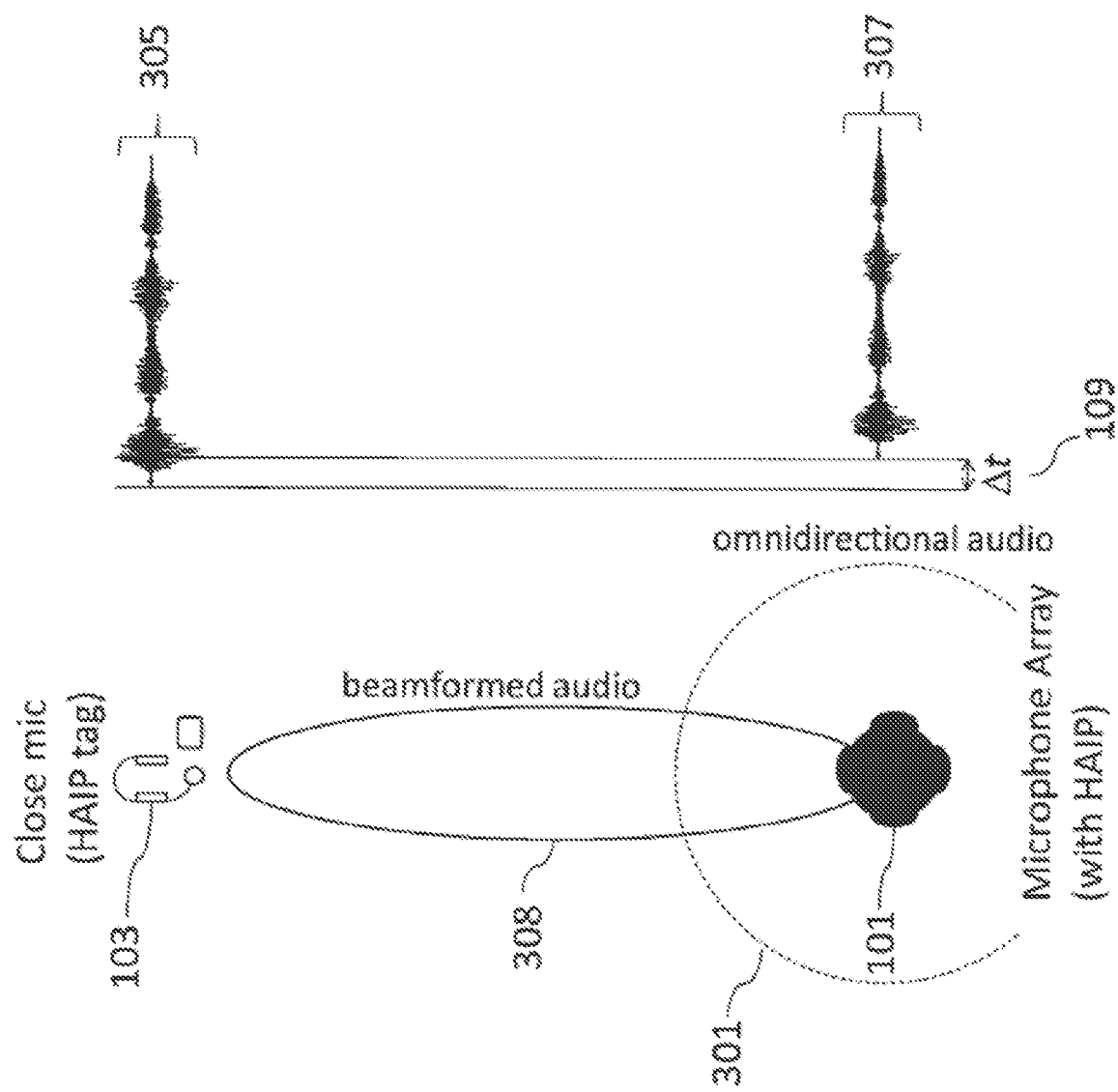

b) NOT Ok for alignment a) Ok for alignment

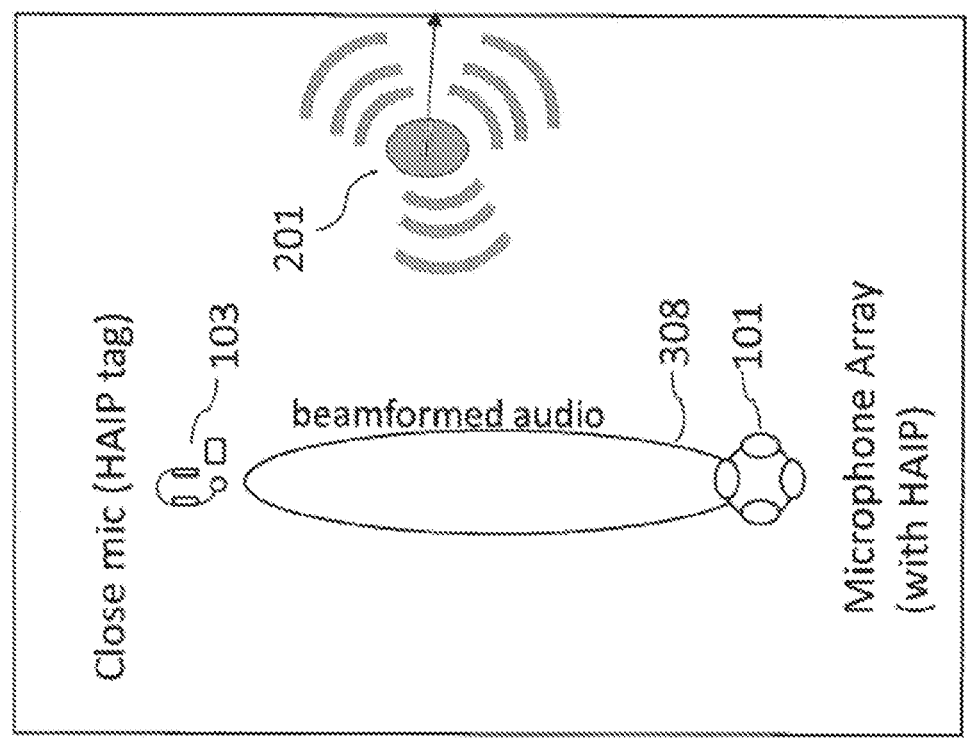

b) Narrow beam a) Default beam width

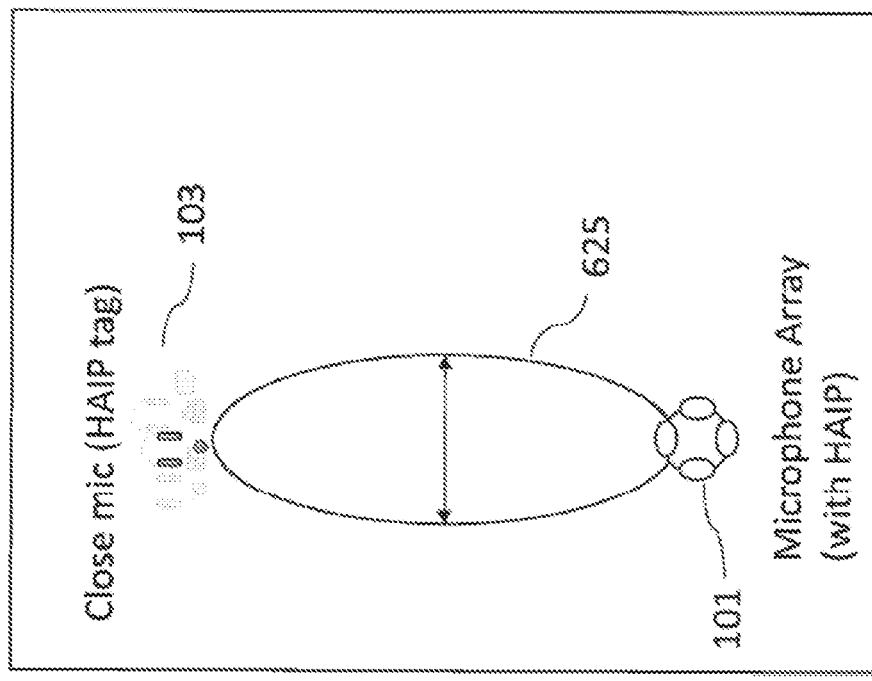

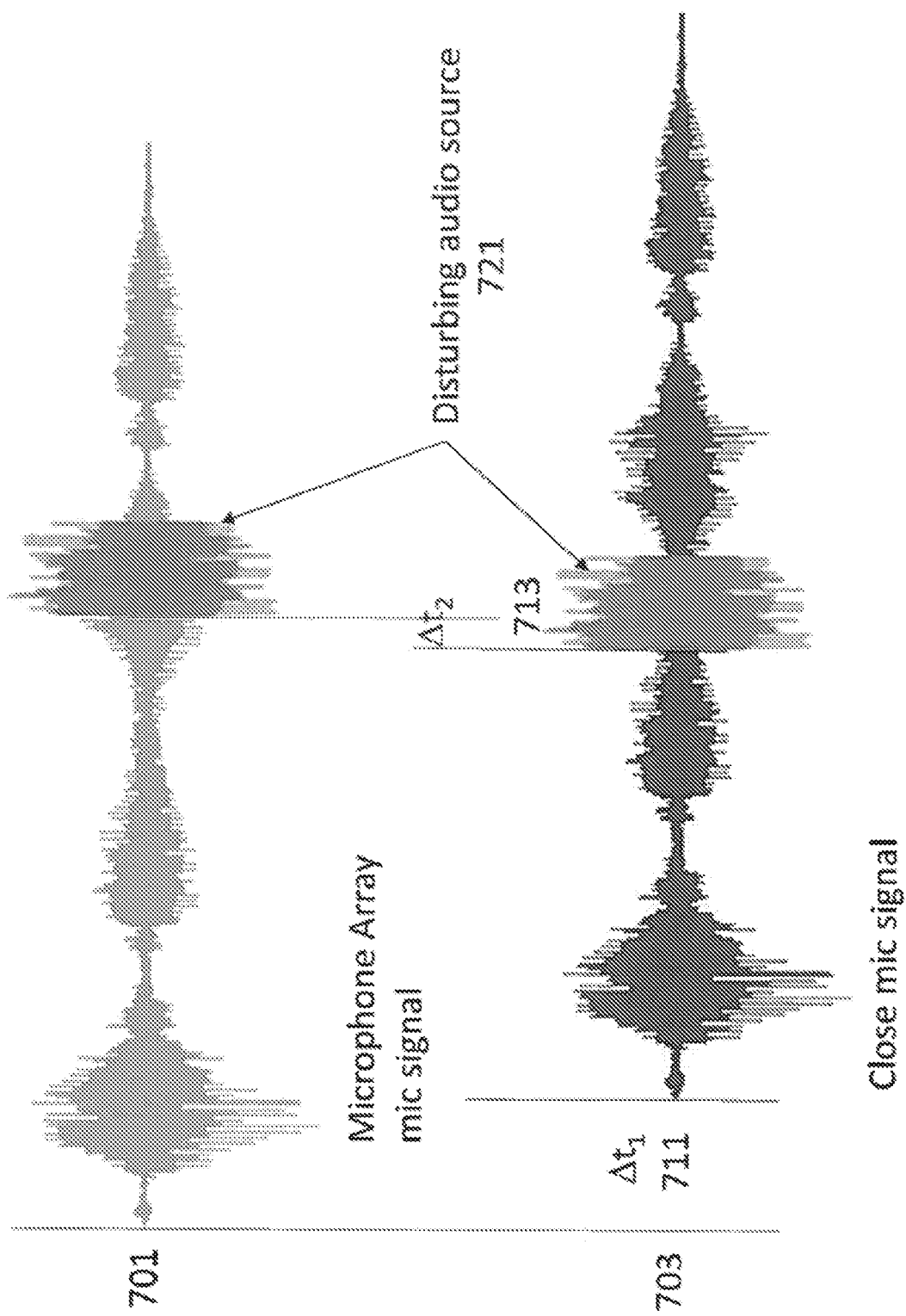

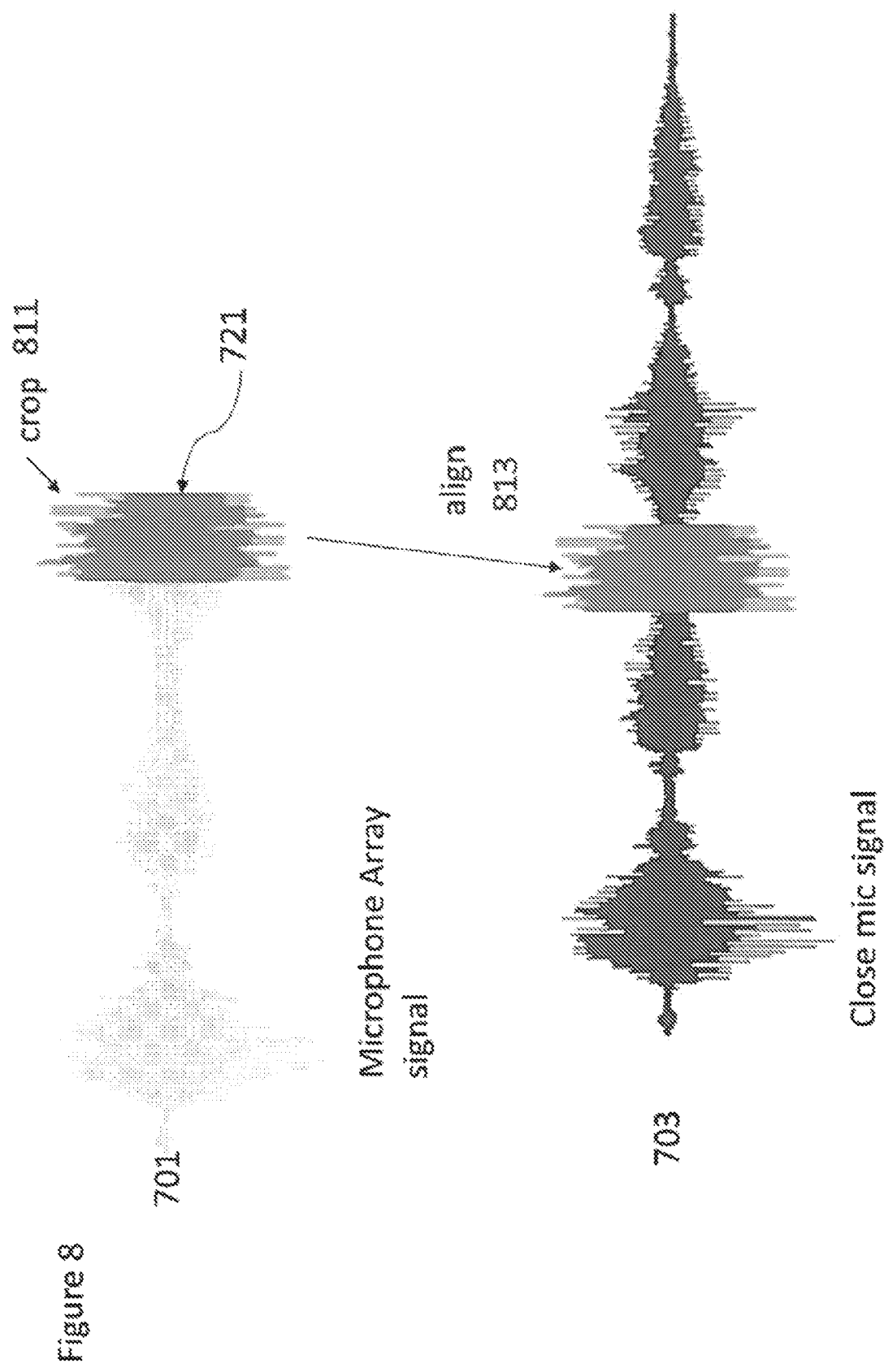

DISTRIBUTED AUDIO CAPTURE AND MIXING CONTROLLING

CROSS REFERENCE TO RELATED APPLICATION

This patent application is a U.S. National Stage application of International Patent Application Number PCT/FI2017/050780 filed Nov. 10, 2017, which is hereby incorporated by reference in its entirety, and claims priority to GB 1619389.8 filed Nov. 16, 2016.

FIELD

The present application relates to apparatus and methods for distributed audio capture and mixing. The invention further relates to, but is not limited to, apparatus and methods for distributed audio capture and mixing for spatial processing of audio signals to enable spatial reproduction of audio signals.

BACKGROUND

The capture of audio signals from multiple sources and mixing of those audio signals when these sources are moving in the spatial field requires significant manual effort. For example the capture and mixing of an audio signal source such as a speaker or artist within an audio environment such as a theatre or lecture hall to be presented to a listener and produce an effective audio atmosphere requires significant investment in equipment and training.

A commonly implemented system is one where one or more close or external microphones (for example Lavalier microphones worn by users or attached to a boom pole to capture audio signals) generate audio signals which are to be mixed with a spatial (or environmental or audio field) audio signal such that the produced source appears to come from an intended direction. As would be expected manually positioning a sound source within the spatial audio field requires significant time and effort to do manually. An additional problem where the mixing is at least partially automated is the alignment of the close and spatial audio signals.

This problem is shown with respect to FIG. 1. In FIG. 1 the close microphone (with optional high accuracy indoor positioning HAIP tag) 103 is shown generating a first audio signal 105. A spatial audio signal capture device (or spatial capture device) such as a Nokia OZO device (also with an optional high accuracy indoor positioning HAIP receiver) 101 is shown having generated a spatial audio signal 107. The aim of the mixer is to produce a mix of the close microphone audio signal 105 with the spatial audio signal 107 such that the audio or sound source, captured by both the close microphone audio signal and the spatial audio signal, sounds as if coming from the correct direction.

The close microphone position may be determined using a positioning method such as Nokia's High Accuracy Indoor Positioning (HAIP) system and the audio signals mixed to generate an audio signal where the close microphone appears to arrive from the determined position. However time delays caused by audio processing and the distance from the close microphone to the spatial capture device microphone array produce a time mismatch Δt 109 between the close microphone audio signal and the spatial capture device audio signal. The two audio signals therefore need to be time aligned before mixing. When the sound captured by the close microphone is also clearly audible at the spatial capture device, it may be possible to use existing audio alignment methods, such as Generalized Cross Correlation with PHAse Transform (GCC-PHAT) methods to determine the delay needed to be applied to one or other of the close microphone audio signal or spatial capture device audio signal in order to align the audio signals before mixing.

FIG. 2, shows a problem which may occur using the known methods for alignment of the audio signals. The system shown in FIG. 2 shows the close microphone 103 generating the first audio signal 105 and the spatial capture device 101 generating the spatial audio signal 105. However as the distance between the close microphone 103 and the spatial capture device 101 increases alignment becomes more difficult. This is because the audio signals which are clearly recorded by the close microphone get quieter at the spatial capture device microphones as the distance between them increases. As the distance increases past a threshold point the known alignment methods completely fail as 'noise' such as audio signals from the surroundings dominates the spatial capture device audio signal. This distance depends on the sensitivity of the microphones, the amplitude of the sound source and the amplitude and frequencies of any 'noise' sources. These 'noise' sources may be other nearby audio or sound sources.

These nearby audio sources might be heard at the spatial capture device microphones and/or the close microphone making alignment even more difficult as the methods for aligning the audio signals attempt to align the distracting or extraneous audio source instead of aligning the signals from the close microphone audio source. For example, as shown in FIG. 2, a distracting loud audio source 201 situated at an intermediate position between the close microphone 103 and the spatial capture device microphones 101, may produce a time difference $\Delta t_x$ 209 between the audio signal 205 associated with the close microphone 103 and the audio signal 207 associated with the spatial capture device microphones 101 which would not reflect the time difference corresponding to the intended sound source (in this case the close microphone sound source).

There is a need to determine whether the delay estimation is the correct delay estimation.

SUMMARY

There is provided according to a first aspect an apparatus comprising a processor configured to: receive an audio signal from a close microphone, wherein the audio signal is input in a spatial audio mixing, and the close microphone is associated with a first sound source; receive a beam-formed audio signal from a microphone array, wherein the beam-formed audio signal is a result of forming a beam of the microphone array directed from the microphone array towards the close microphone so as to enhance the audio signal; determine a time duration where no further sound source is active within the sound scene comprising the first sound source; and determine a time difference, during the time duration, between the audio signal and the beam-formed audio signal to enable alignment of the audio signal and the beam-formed audio signal.

The processor configured to receive the beam-formed audio signal from a microphone array may be configured to: determine an orientation angle from the microphone array to the close microphone; and generate the beam-formed audio signal based on the determined orientation angle.

The processor configured to determine the orientation angle from the microphone array to the close microphone may be configured to determine the orientation angle based on at least one of: a satellite positioning system estimate of the close microphone and/or the microphone array; an inertial positioning system estimate of the close microphone and/or the microphone array; a radio frequency beacon system estimate of the close microphone and/or the microphone array; a high accuracy indoor positioning (HAIP) system estimate of a positioning (HAIP) tag associated with the close microphone and/or the microphone array; and a visual object tracking system estimate of an object associated with the close microphone and/or the microphone array.

The processor configured to generate the beam-formed audio signal may be further configured to adaptively change a beam width for the beam-formed audio signal.

The processor configured to adaptively change the beam width for the beam-formed audio signal may be configured to adaptively change the beam width for the beam-formed audio signal based on at least one of: an amplitude of the close microphone audio signal; an amplitude of the microphone array audio signal; a position of a sound source; and a variance of a position of the close microphone.

The processor configured to determine the time duration where no further sound source is present between positions of the microphone array and the close microphone may be configured to determine the duration where there is an absence of a further sound source within an audio scene comprising the first sound source.

The processor configured to determine the time duration where no further sound source is present between positions of the microphone array and the close microphone may be configured to: determine at least one further sound source within an audio scene comprising the first sound source; determine a position of the at least one further sound source; and determine, for the time duration, the position of the at least one further sound source is not between the microphone array and the first sound source.

The processor configured to determine a time difference, during the time duration, between the audio signal and the beam-formed audio signal may be further configured to remove segments from the audio signal and/or the beam-formed audio signal based on a determination, for a second time duration of the beam-formed audio signal from microphone array signal, of a presence of at least one further sound source within the beam-formed audio signal.

The processor configured to selectively remove segments from the audio signal and the beam-formed audio signal may be configured to: determine the second time duration; determine a further sound source time difference between the beam-formed audio signal and the audio signal by identifying within the audio signal the presence of the at least one further sound source matching the presence during the second time duration of the beam-formed audio signal; remove the time segment associated with the second time duration from the beam-formed audio signal; and remove the time segment associated with the second time duration adjusted by the further sound source time difference from the audio signal.

The processor configured to determine the time duration where no further sound source is present between positions of the microphone array and the close microphone may be configured to perform at least one of: visually determine the presence of the further sound source; determine the presence the further source based on a position estimate from a positioning system associated with the further sound source; and determine the presence of the further sound source by determining an orientation based on directional analysis of the beam-formed audio signal differs significantly from an estimate of a position of the close microphone.

The processor may be further configured to mix and/or process the audio signal based on using the time difference to align the audio signal and the beam-formed audio signal.

According to a second aspect there is provided a method comprising: receiving an audio signal from a close microphone, wherein the audio signal is input in a spatial audio mixing, and the close microphone is associated with a first sound source; receiving a beam-formed audio signal from a microphone array, wherein the beam-formed audio signal is a result of forming a beam of the microphone array directed from the microphone array towards the close microphone so as to enhance the audio signal; determining a time duration where no further sound source is active within the sound scene comprising the first sound source; and determining a time difference, during the time duration, between the audio signal and the beam-formed audio signal to enable alignment of the audio signal and the beam-formed audio signal.

Receiving the beam-formed audio signal from a microphone array may comprise: determining an orientation angle from the microphone array to the close microphone; and generating the beam-formed audio signal based on the determined orientation angle.

Determining the orientation angle from the microphone array to the close microphone may comprise at least one of: determining a satellite positioning system estimate of the close microphone and/or the microphone array; determining an inertial positioning system estimate of the close microphone and/or the microphone array; determining a radio frequency beacon system estimate of the close microphone and/or the microphone array; determining a high accuracy indoor positioning (HAIP) system estimate of a positioning (HAIP) tag associated with the close microphone and/or the microphone array; and determining a visual object tracking system estimate of an object associated with the close microphone and/or the microphone array.

Generating the beam-formed audio signal may further comprise adaptively changing a beam width for the beam-formed audio signal.

Adaptively changing the beam width for the beam-formed audio signal may comprise adaptively changing the beam width for the beam-formed audio signal based on at least one of: an amplitude of the close microphone audio signal; an amplitude of the microphone array audio signal; a position of a sound source; and a variance of a position of the close microphone.

Determining the time duration where no further sound source is present between positions of the microphone array and the close microphone may comprise determining the duration where there is an absence of a further sound source within an audio scene comprising the first sound source.

Determining the time duration where no further sound source is present between positions of the microphone array and the close microphone may comprise: determining at least one further sound source within an audio scene comprising the first sound source; determining a position of the at least one further sound source; and determining, for the time duration, the position of the at least one further sound source is not between the microphone array and the first sound source.

Determining a time difference, during the time duration, between the audio signal and the beam-formed audio signal may comprise removing segments from the audio signal and/or the beam-formed audio signal based on a determination, for a second time duration of the beam-formed audio signal from microphone array signal, of a presence of at least one further sound source within the beam-formed audio signal.

Selectively removing segments from the audio signal and the beam-formed audio signal may comprise: determining the second time duration; determining a further sound source time difference between the beam-formed audio signal and the audio signal by identifying within the audio signal the presence of the at least one further sound source matching the presence during the second time duration of the beam-formed audio signal; removing the time segment associated with the second time duration from the beam-formed audio signal; and removing the time segment associated with the second time duration adjusted by the further sound source time difference from the audio signal.

Determining the time duration where no further sound source is present between positions of the microphone array and the close microphone may comprise at least one of: visually determining the presence of the further sound source; determining the presence the further source based on a position estimate from a positioning system associated with the further sound source; and determining the presence of the further sound source by determining an orientation based on directional analysis of the beam-formed audio signal differs significantly from an estimate of a position of the close microphone.

The method may further comprise mixing and/or processing the audio signal based on using the time difference to align the audio signal and the beam-formed audio signal.

According to a third aspect there is provided an apparatus comprising: means for receiving an audio signal from a close microphone, wherein the audio signal is input in a spatial audio mixing, and the close microphone is associated with a first sound source; means for receiving a beam-formed audio signal from a microphone array, wherein the beam-formed audio signal is a result of forming a beam of the microphone array directed from the microphone array towards the close microphone so as to enhance the audio signal; means for determining a time duration where no further sound source is active within the sound scene comprising the first sound source; and means for determining a time difference, during the time duration, between the audio signal and the beam-formed audio signal to enable alignment of the audio signal and the beam-formed audio signal.

The means for receiving the beam-formed audio signal from a microphone array may comprise: means for determining an orientation angle from the microphone array to the close microphone; and means for generating the beam-formed audio signal based on the determined orientation angle.

The means for determining the orientation angle from the microphone array to the close microphone may comprise at least one of: means for determining a satellite positioning system estimate of the close microphone and/or the microphone array; means for determining an inertial positioning system estimate of the close microphone and/or the microphone array; means for determining a radio frequency beacon system estimate of the close microphone and/or the microphone array; means for determining a high accuracy indoor positioning (HAIP) system estimate of a positioning (HAIP) tag associated with the close microphone and/or the microphone array; and means for determining a visual object tracking system estimate of an object associated with the close microphone and/or the microphone array.

The means for generating the beam-formed audio signal may further comprise means for adaptively changing a beam width for the beam-formed audio signal.

The means for adaptively changing the beam width for the beam-formed audio signal may comprise means for adaptively changing the beam width for the beam-formed audio signal based on at least one of: an amplitude of the close microphone audio signal; an amplitude of the microphone array audio signal; a position of a sound source; and a variance of a position of the close microphone.

The means for determining the time duration where no further sound source is present between positions of the microphone array and the close microphone may comprise means for determining the duration where there is an absence of a further sound source within an audio scene comprising the first sound source.

The means for determining the time duration where no further sound source is present between positions of the microphone array and the close microphone may comprise: means for determining at least one further sound source within an audio scene comprising the first sound source; means for determining a position of the at least one further sound source; and means for determining, for the time duration, the position of the at least one further sound source is not between the microphone array and the first sound source.

The means for determining a time difference, during the time duration, between the audio signal and the beam-formed audio signal may comprise means for removing segments from the audio signal and/or the beam-formed audio signal based on a determination, for a second time duration of the beam-formed audio signal from microphone array signal, of a presence of at least one further sound source within the beam-formed audio signal.

The means for selectively removing segments from the audio signal and the beam-formed audio signal may comprise: means for determining the second time duration; means for determining a further sound source time difference between the beam-formed audio signal and the audio signal by identifying within the audio signal the presence of the at least one further sound source matching the presence during the second time duration of the beam-formed audio signal; means for removing the time segment associated with the second time duration from the beam-formed audio signal; and means for removing the time segment associated with the second time duration adjusted by the further sound source time difference from the audio signal.

The means for determining the time duration where no further sound source is present between positions of the microphone array and the close microphone may comprise at least one of: means for visually determining the presence of the further sound source; means for determining the presence the further source based on a position estimate from a positioning system associated with the further sound source; and means for determining the presence of the further sound source by determining an orientation based on directional analysis of the beam-formed audio signal differs significantly from an estimate of a position of the close microphone.

The apparatus may further comprise means for mixing and/or means for processing the audio signal based on using the time difference to align the audio signal and the beam-formed audio signal.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which:

FIG. 4 shows schematically a beamformed delay estimation according to some embodiments;

FIGS. 5a to 5c show schematically beamformed delay estimation alignment switching as shown in FIG. 4 according to some embodiments;

FIGS. 6a to 6c show schematically variable beamformed delay estimation alignment as shown in FIG. 4 according to some embodiments;

FIG. 7 shows an example of audio signal traces from close microphone and spatial capture devices where an interfering audio source is present;

FIG. 8 shows an example of audio signal traces from close microphone and spatial capture devices where an interfering audio source component is identified;

EMBODIMENTS OF THE APPLICATION

Figure 1:
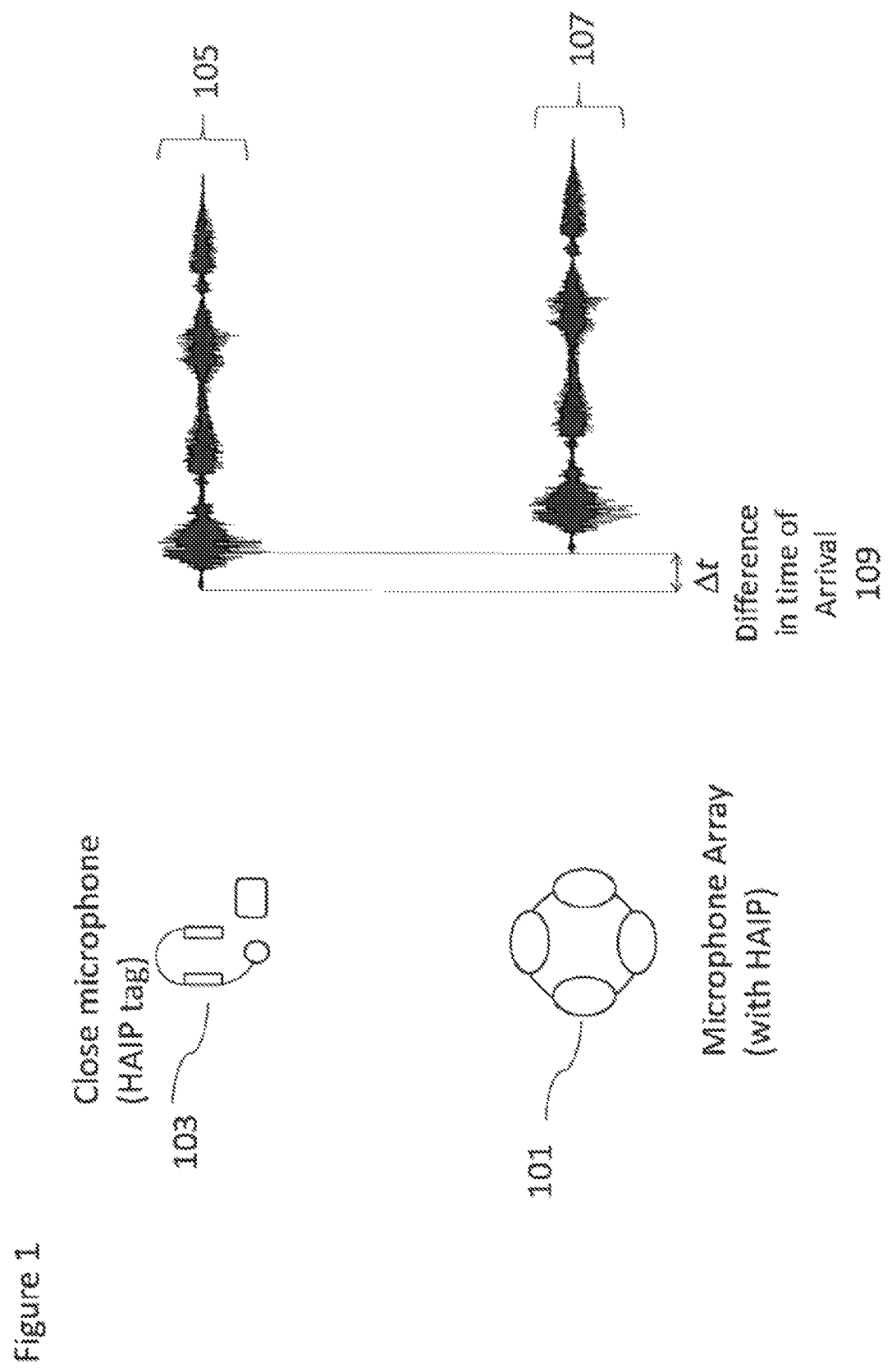
FIGS. 1 and 2 show schematically example prior art delay estimation scenarios.
Figure 2:
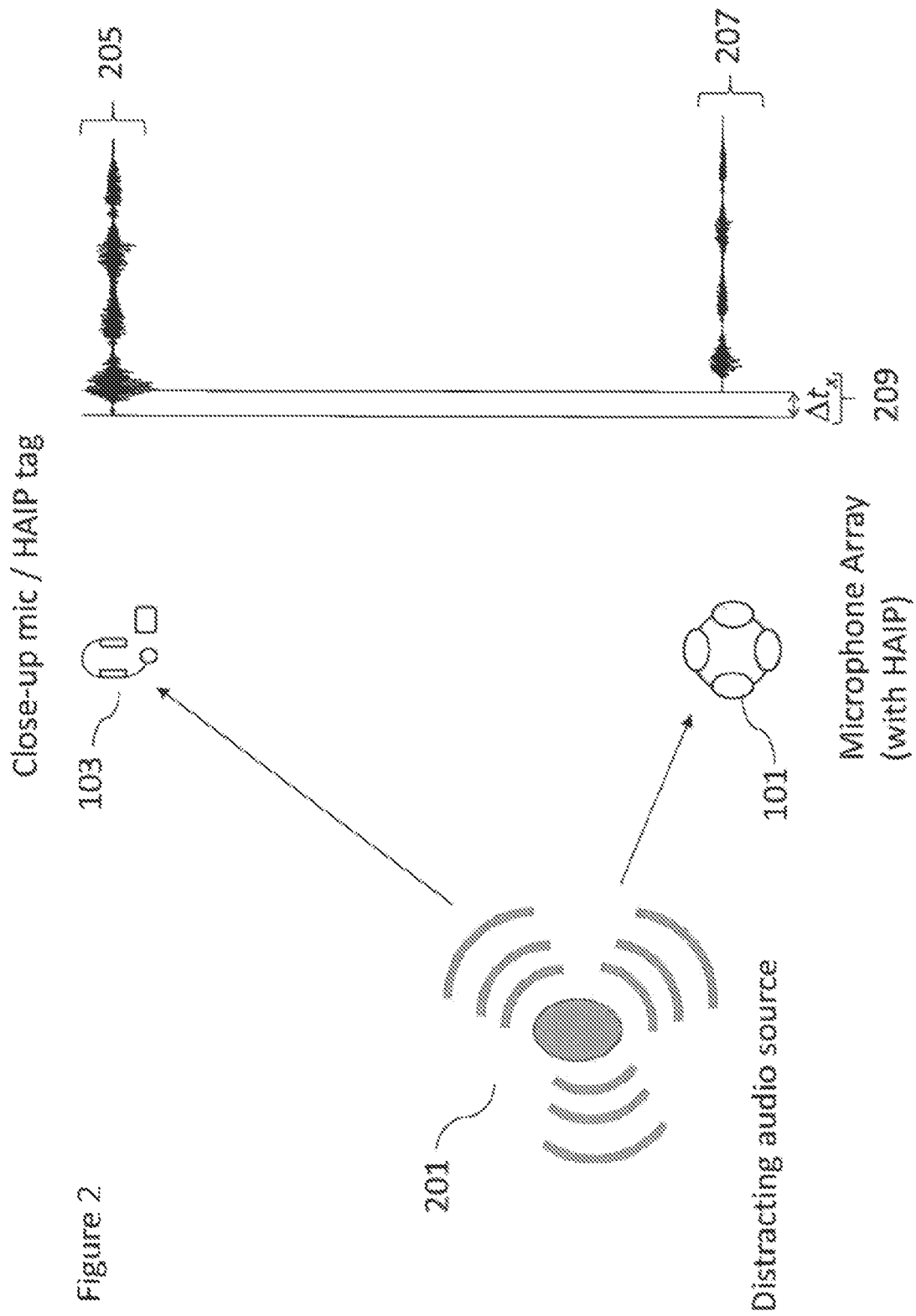

The following describes in further detail suitable apparatus and possible mechanisms for the provision of effective audio signal alignment between audio signals associated with close microphones and audio signals associated with the spatial capture device microphones. In the following examples, audio signals and audio capture signals are described. However it would be appreciated that in some embodiments the apparatus may be part of any suitable electronic device or apparatus configured to capture an audio signal or receive the audio signals and other information signals.

The concept as described herein in further detail is to perform audio beamforming using the spatial capture device microphone array in order to enhance the sound from the direction of the close microphone source in order to improve alignment. This may then further implemented by the following operations:

First obtain an estimate of the position or location of the close microphone and determine its orientation angle relative to the spatial capture device microphone array. As described herein the position of the close microphone audio source may be done using HAIP or a combination of visual object tracking and HAIP positioning.

Second determine suitable alignment time slots or periods where no potential distracting audio sources are present. In some embodiments this may be performed by a combination of HAIP tracking and visual analysis. A distracting audio or sound source may be any further sound source which is active within the sound scene comprising the sound source associated with the close microphone. The active sound source is a sound source which is able to distract the processes typically being performed such as time alignment between audio signals. The sound source may for example be located between a microphone array and the close microphone and has an amplitude which is large enough to be received by the microphone array and/or close microphone. The sound source may in some further examples not be located between the microphone array and the close microphone but be significantly loud to be received by the microphone array and/or close microphone.

Third using the spatial capture device microphone array, construct an audio beam in the determined direction and record a beamformed audio signal. In some embodiments the width of the constructed beam is variable and may be determined based on visual analysis of the scene and the HAIP position(s) of tracked sources.

Fourth time align the close microphone audio signals and beamformed spatial capture device audio signals to determine the time-difference between the signals. In some embodiments the time alignment is performed only for the alignment time slots determined in the second step.

Furthermore in some embodiments the method may be further improved to increase the accuracy of the alignment by performing a direction of arrival (DOA) estimation using audio signals from the spatial capture device microphone array to determine the direction of the most dominant audio source. Then, when the dominant audio source direction of arrival as determined from the audio signals matches the determined angle from the HAIP then perform a time alignment between the audio signals associated with close microphones and audio signals associated with the spatial capture device microphones.

Figure 3:
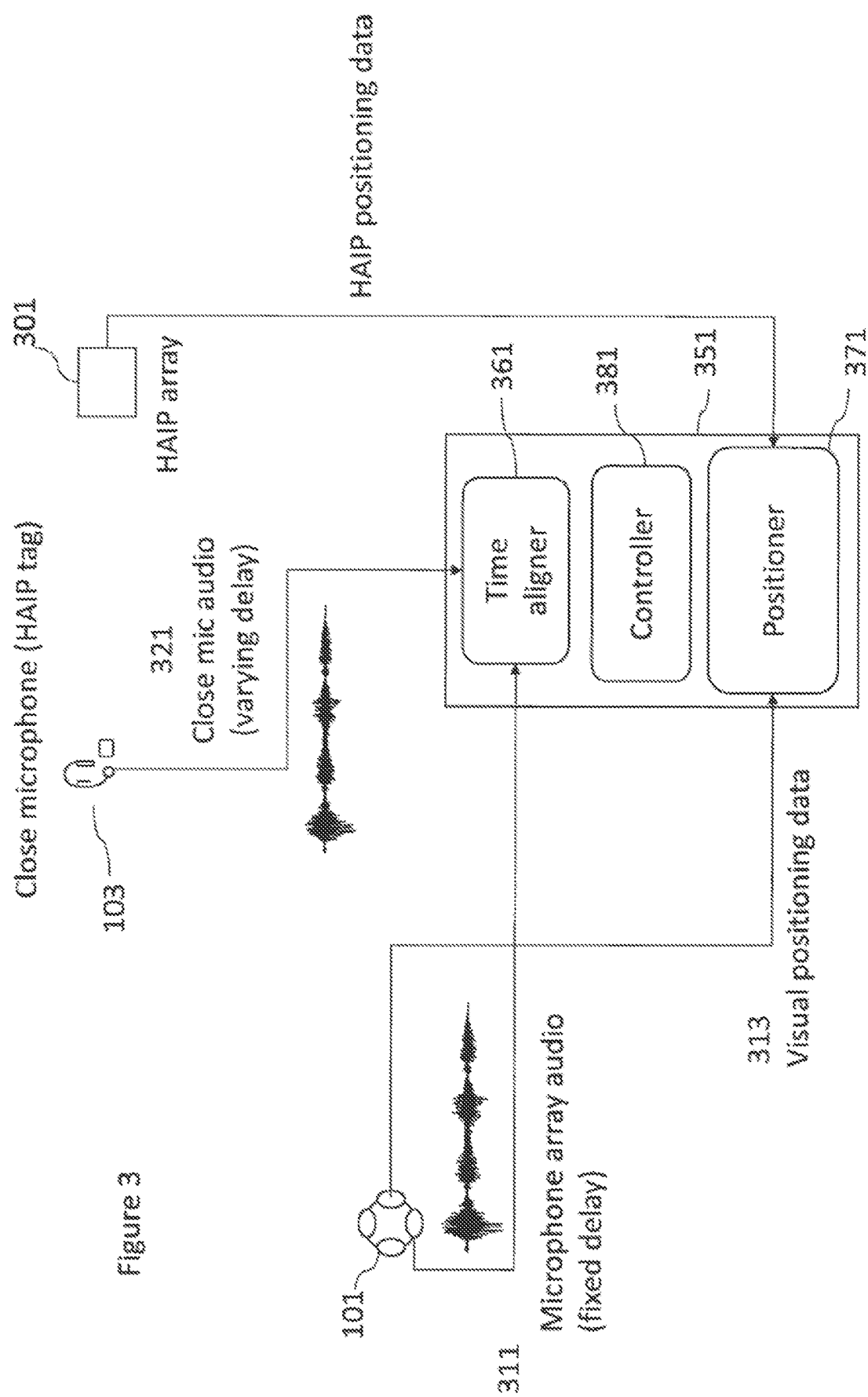
FIG. 3 shows schematically a system within which embodiments may be implemented.

With respect to FIG. 3 a system is shown comprising apparatus which may be used in embodiments to perform the methods described herein. The system show comprises the close microphone 103 and close microphone audio signal 321 which has a 'variable' delay element. The close microphone 103 is configured to transmit the close microphone signal 321 to the processor 351.

Furthermore the system is shown comprising the spatial capture device 101 (which in this example is shown as a Nokia OZO). The spatial capture device 101 may comprise a microphone array configured to generate the spatial capture device audio signal(s) 311. The spatial capture device audio signals may be considered to be 'fixed' delay elements. The spatial capture device 101 may be configured to transmit the spatial capture device audio signal 311 to the processor 351. The spatial capture device 101 may furthermore comprise at least one camera configured to generate visual positioning data, for example images of the scene being captured by the spatial capture device microphone array.

The system in some embodiments comprises a position determiner 301. In the examples shown the position determiner operations are performed using a high accuracy indoor position (HAIP) receiver array configured to receive signals from a HAIP tag or positioning tag which is on or next to a device to be located. The position estimate is then passed to the processor 351 However in some embodiments the position determiner operations may be performed by any suitable position or location determination apparatus or system. For example in some embodiments the position determiner function is performed within the device (for example the device comprising the close microphone and/or the spatial capture device) and the determined position is output to the processor directly. In some embodiments the close microphone device and/or the spatial capture device thus generates a position estimate using a radio-frequency beacon device locating system, a satellite positioning system, a gyroscope based inertial system or similar. In some embodiments the position determiner may be part of the spatial capture device 101 or part of the processor 351.

In some embodiments the system comprises a processor 351 configured to receive the spatial capture device audio signal 311 and the close microphone device audio signal 321 and perform alignment of the audio signals based on the following methods. In some embodiments the spatial capture device audio signal 311 and the close microphone device audio signal 321 are specifically received by a time aligner 361 (which may be a function or module) within the processor 351 configured to do the alignment under control of a controller 381.

The processor 351 may comprise a controller 381 configured to control the time aligner 361. In some embodiments the controller 381 is configured to control the time aligner 361 based on the output of a positioner 371. The processor 351 may comprise a positioner 371 configured to receive visual positioning data 313 from the spatial capture device 101 and furthermore the determined position of the close microphone 103 (and furthermore the spatial capture device 101) from the position determiner 301.

The implementation of the concept of the embodiments shown herein is shown in FIG. 4 wherein audio signals 305 associated with close microphones 103 and audio signals 307 associated with the spatial capture device 101 microphones are aligned. However the audio signals 307 associated with the spatial capture device 101 microphones used for the alignment operations are audio beam-formed 308 audio signals rather than the omnidirectional 301 audio signals typically used in the known examples. The audio beamforming of the spatial capture device 101 microphones by directionally focusing on the location associated with the close microphone audio source decreases the amount of background noise within the spatial capture device audio signals 307 and furthermore reduces the possibility of a noise/disturbing audio source is captured by both the close microphone and the spatial capture device microphone and an incorrect alignment occurs.

The implementation of audio beamforming the spatial capture device 101 microphones requires accurate knowledge of the position of the close microphone relative to the spatial capture device. In some embodiments this may be achieved by first determining or obtaining the position of the close microphone 103 and then determine its angle relative to the spatial capture device microphone array. The determination of the position of the close microphone source may be implemented according to any suitable manner. In some embodiments this position determination may be performed using the high accuracy indoor positioning (HAIP) system information from the HAIP receiver array 301 which receives radio signals from the positioning (HAIP) tag located on the close microphone and from these signals is able to locate the source of the radio signals. In some embodiments the position determination may be performed using a combination of visual object tracking and HAIP positioning information.

For example a positioner 371 within the processor 351 may be configured to receive a HAIP determined position for a close microphone and then using camera images, for example from cameras located on the spatial capture device (such as those on the Nokia OZO) the positioner 371 is configured to perform image processing to determine a visual recognition of the area around the HAIP position (and generate a 'visual fingerprint' of the object/persons at the expected location). The object/persons as represented by the 'visual fingerprint' may then be tracked using visual tracking methods. In some embodiments the positioner may furthermore generate a position estimate using a particle filter based combination of the HAIP position information and the visual tracker information. In some circumstances, for example in low light conditions, visual tracking may fail or reflections from walls may affect the HAIP position estimate. To attempt to allow for these conditions, in some embodiments, statistics are calculated on the position estimates. These statistics, for example variance within a time window, may be used to determine when the estimate is noisy or stable.

Having determined the position of the close microphone and performing audio beamforming of the spatial capture device 101 microphones to focus on the position of the close microphone. The alignment of the spatial capture device 101 microphone audio signal and the close microphone audio signal can be performed with an improvement over the conventional alignment process with a reduction of the background noise.

In some embodiments this may be further improved on by performing alignment between the audio signals for appropriate time slots or times. The system and in some embodiments the processor may be configured to determine times when the time alignment estimates may be erroneous or unreliable. For example in some embodiments the system is configured to determine whether a distracting or 'noise' audio signal source 201 is located between the close microphone 103 and the spatial capture device 101. This may be implemented by searching for temporal segments that potentially contain disturbing audio sources.

Figure 5B:
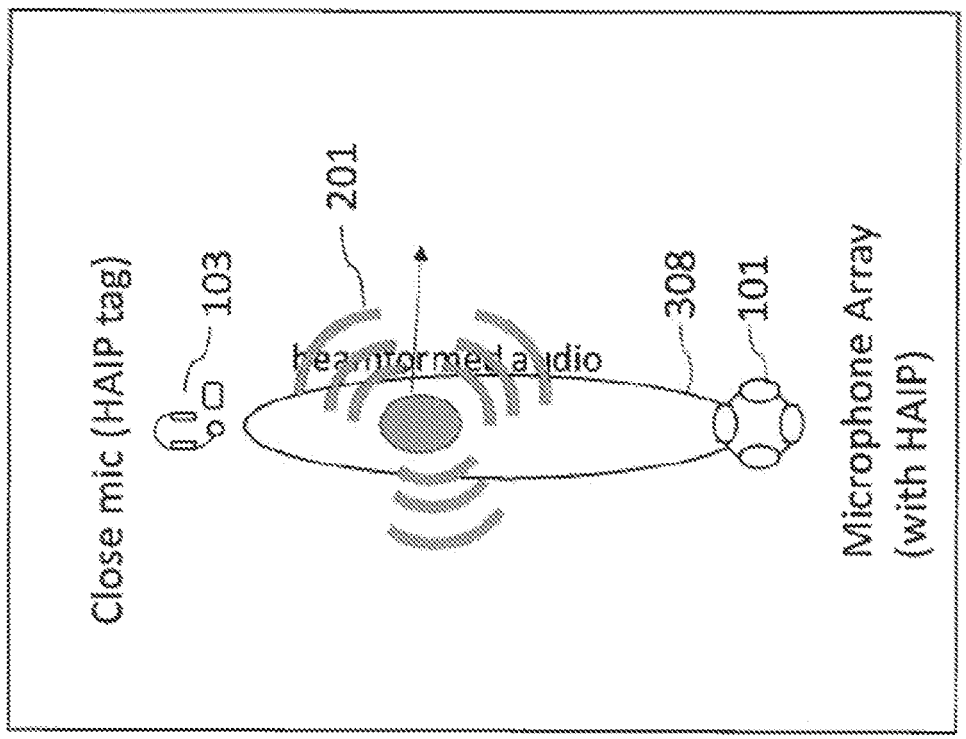
Figure 5A:
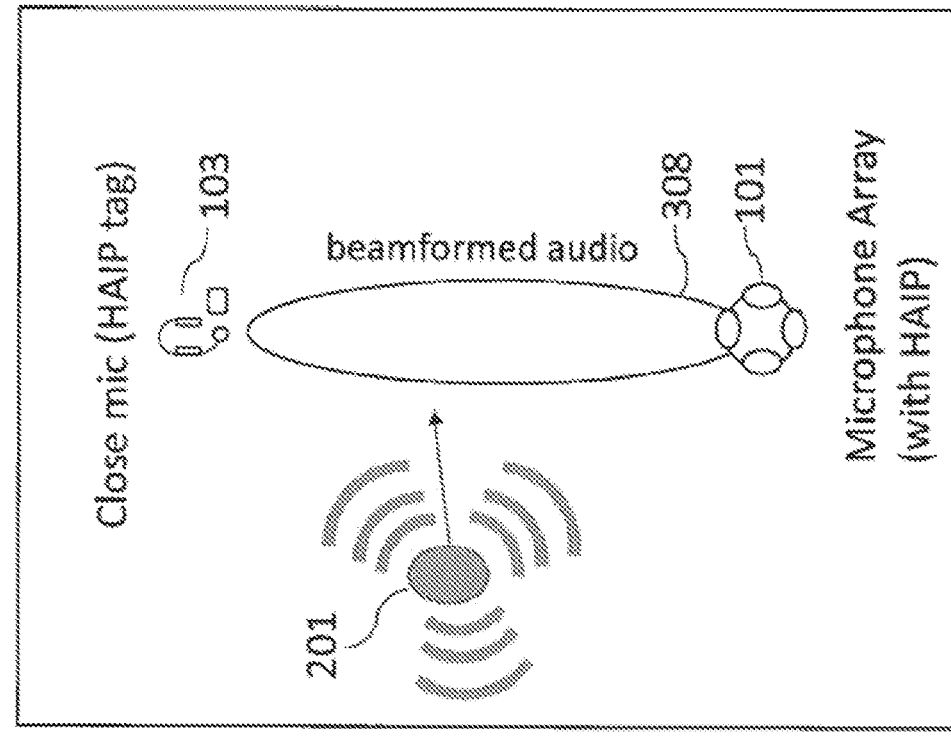

For example FIGS. 5a to 5c show where an object representing a distracting audio signal source 201 moves between the close microphone 103 and the spatial capture device 101 microphone array and specifically within the audio beam of the spatial capture device 101. When the 'noise' audio signal source 201 is located between the close microphone and the spatial capture device microphone array, it will make the time alignment more difficult or impossible.

In some embodiments the 'noise' audio signal source 201 object is a person or object equipped with a positioning tag (such as the HAIP tag) and as such the position of the 'noise' audio signal source 201 object is known (for example by the HAIP array 301). In such embodiments the positioner 371 within the processor 351 can pass the information of the position of the close microphone 103 and the 'noise' audio signal source 201 object and the controller 381 is configured to control the alignment of the audio signals such that where the position of the 'noise' audio signal source 201 object is determined to be between the spatial capture device 101 and the close microphone 103 then alignment is not performed. In such embodiments a previous alignment value may be used until the 'noise' audio signal source 201 object moves away from the beam.

In some embodiments, where the 'noise' audio signal source 201 object is not being tracked by the beacon (HAIP) or otherwise positioning system, positions of the 'noise' audio signal source 201 object can be determined by visual means. Any suitable means and method for visual recognition of the object may be performed. For example http://papers.nips.cc/paper/5207-deep-neural-networks-for-object-detection.pdf describes a neural network based system for identifying an object within an image. Based on the object recognition/detection the system (for example the controller 381) may be able to detect when an object is moving close to the close microphone 103. The controller 381 may then be configured to mark or identify these times and control the time aligner 361 to prevent alignment from being performed or to discard the results of any alignment operation performed at the identified time.

An example of this is shown in FIGS. 5a to 5c wherein a 'noise' audio signal source 201 object moves across the beam in the audio beam-formed audio signal. FIG. 5a shows the position (or direction) of the close microphone 103 relative to the spatial capture device 101 at a time t1. At time t1 the positions of the close microphone 103 and the 'noise' audio signal source 201 object relative to the spatial capture device 101 is outside a defined threshold value. As such the beamformed audio signal 308 and the audio signal from the close microphone 103 may be used to perform time alignment.

The 'noise' audio signal source 201 object moves such that FIG. 5b shows the position (or direction) of the close microphone 103 relative to the spatial capture device 101 at a time t2. At time t2 the positions of the close microphone 103 and the 'noise' audio signal source 201 object relative to the spatial capture device 101 is within the defined threshold value. As such time alignment is not performed as the audio signals from the 'noise' audio signal source 201 object would interfere and cause errors when attempting to align the close microphone 103 audio signal and the spatial capture device microphone array audio signals.

The 'noise' audio signal source 201 object moves furthermore such that FIG. 5c shows the position (or direction) of the close microphone 103 relative to the spatial capture device 101 at a time t3. At time t3 the positions of the close microphone 103 and the 'noise' audio signal source 201 object relative to the spatial capture device 101 is outside the defined threshold value and time alignment can be performed as the audio signals from the 'noise' audio signal source 201 object would not interfere and cause errors attempting to align the close microphone 103 audio signal and the spatial capture device microphone array audio signals.

In some embodiments to further improve time alignment performance the system (for example the controller 381 or processor in general) may be configured to remove sections from the audio signals for which the alignment may fail. This may be implemented by performing direction of arrival (DOA) estimation on the omnidirectional or beamformed spatial capture device microphone array audio signals to determine the direction of the most dominant audio source. In some embodiments the dominant audio source may be determined using the SRP-PHAT method. Thus in some embodiments the amount of spatial audio signal energy in directions around the microphone array may be determined. This spatial audio signal energy information may then be used together with the determined (for example using the HAIP system) position of the close microphone to control the implementation of time alignment only when the dominant audio source is aligned with the HAIP determined angle of the close microphone.

Thus in such embodiments alignment with some other sound source in the direction of close-up mic speech or audio is avoided.

For example if the set of directions around the spatial capture device are defined as o=1 ... O. The observed spatial energy $Z_{no}$ over all directions o and around the microphone array is calculated using Steered Response Power (SRP) with PHAT weighting. In other embodiments other methods may be used. Observed spatial energy $Z_{no}$ may be:

$$= \sum_{u=1}^{M} \sum_{m=u+1}^{M} \sum_{f=1}^{F} \left( \frac{x_{fnu} x_{fnv}^*}{|x_{fnu} x_{fnv}^*|} e^{j2\pi f(\tau(o,u)-\tau(o,m))} \right)^2$$

$Z_{no}$ is the amount of spatial energy at each direction o around the device at different times n.

For each time n, determine the max $Z_{no}$ and store the maximum energy direction as $maxZ_n$.

From the determined positioning, $H_n$, is defined as being the position direction of the close microphone at time n.

When $maxZ_n$ and $H_n$ are within a threshold of each other for a time n then the controller may be configured to control the time aligner 361 to use the audio signals for that time for time alignment.

In some embodiments in order to further improve the performance of the alignment operations the system may be configured to adapt the width of the audio beam used in the beamforming of the spatial capture device microphone array audio signals.

Figure 6B:
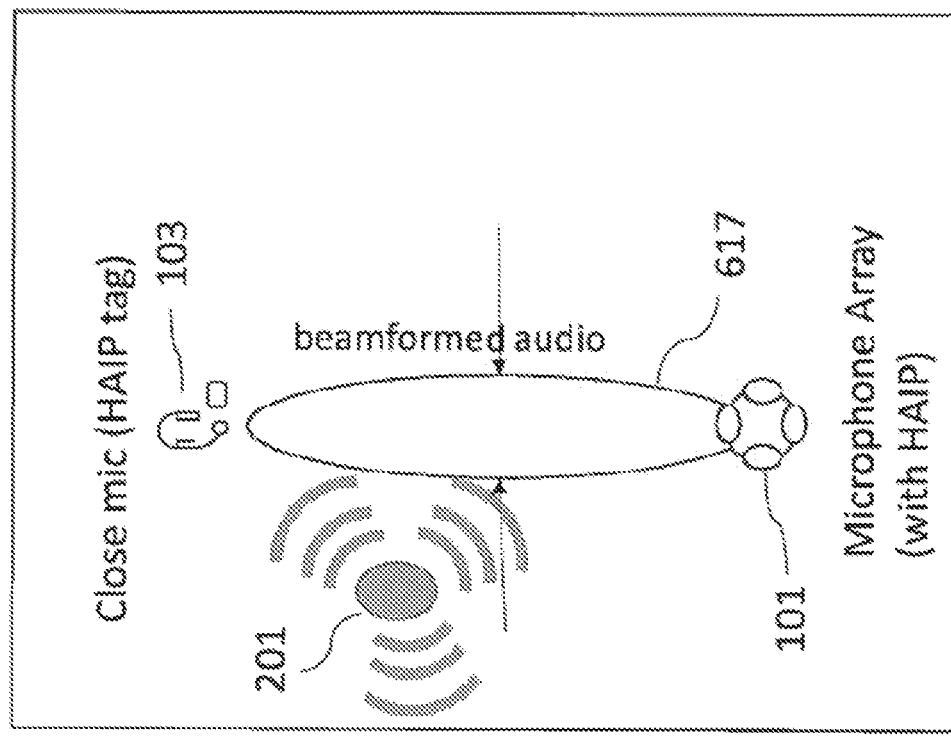
Figure 6A:
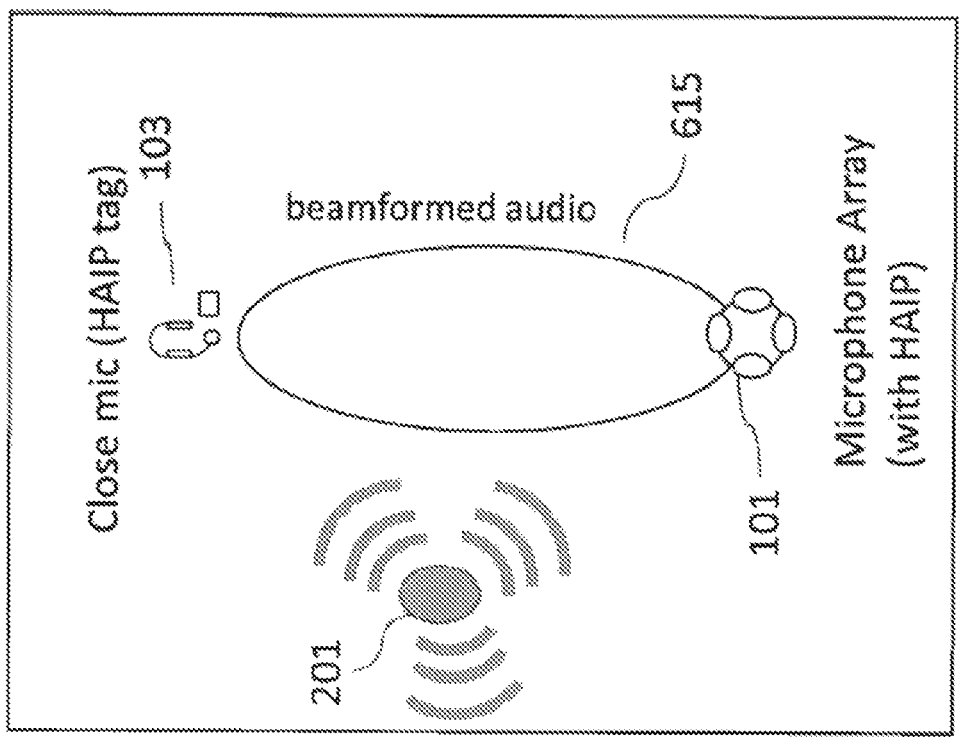
Figure 9:
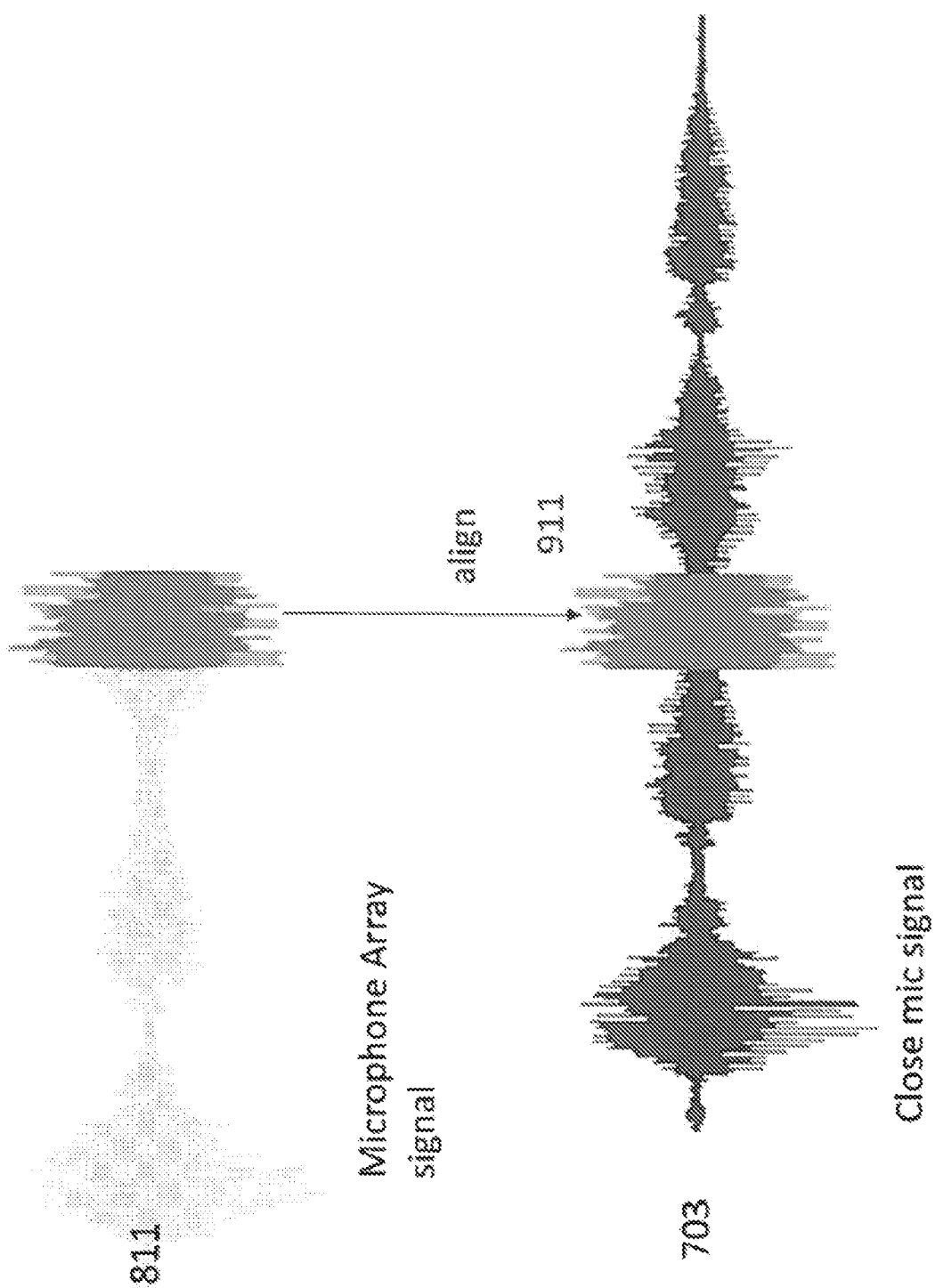
FIG. 9 shows an example of audio signal traces from close microphone and spatial capture devices where an interfering audio source is aligned after being identified as shown in FIG. 8.

FIGS. 6a to 6c show example situations where adjusting the width of the beam used in beamforming is beneficial.

Thus for example FIG. 6a shows an example where a 'noise' audio signal source 201 object is located away from the close microphone 103 relative to the spatial capture device 101 and a 'standard beam' or default beam 615 is employed.

FIG. 6b shows an example where the 'noise' audio signal source 201 object is located nearby the close microphone 103 relative to the spatial capture device 101 and a 'narrow beam' 617 is employed in order that the energy of the audio signal from the 'noise' audio signal source 201 does not contaminate the alignment.

FIG. 6c shows an example where the positioning data is noisy (for example the determined position has a high variance within a time window ~1 s). As the positioning information is not able to accurately determine a precise location for the close microphone in order to capture as much as possible of the close microphone audio source energy at the spatial capture device microphone array the audio beamforming of the spatial capture device audio signal beam 625 may be set to be wider than the default beam.

It is known that performing audio beamforming the effective length of the microphone array (L) controls the beam width. The longer the effective length of the array, the narrower the beam width it is possible to produce. Thus, in some embodiments it may be possible to determine the desired length of the array based on the variance of the position in a time window.

$$L=K*1/\text{var}(Hn), n=i \ldots i+\text{window\_length}$$

where Hn is the position (orientation) of the close microphone signal, var(Hn) its variance and K is a suitably selected constant.

L may be the adjusted in the array by selecting (switching on/off) the first or last microphones from the array to change its effective length.

In some embodiments, the microphone array may be formed on or supported by an expandable framework, which can be controlled by the controller to allow an increasing or decreasing of the effective microphone array length. The length could be increased or decreased in the vertical or horizontal direction based on the relative position of the distracting sound sources.

With respect to FIGS. 7 to 12 a series of example time alignment operations are shown which may be implemented using the system shown in FIG. 3 wherein audio signals within a sequence are cropped from the alignment process. Furthermore the operations which may be implemented on the system shown in FIG. 3 are furthermore shown within the flow diagram of FIG. 13.

FIG. 7 shows the audio signals to be aligned. The example close microphone audio signal (Close-up mic signal) 703 and the spatial capture device microphone audio signal (OZO mic signal) 701. In the example shown the Δt1 711 is the time difference between the two audio signals that we are interested in. However within the audio signals is a sequence which was dominated by a disturbing audio source 721 which can be seen in both audio signal recordings. This source is shown as being located closer to the close microphone than the spatial capture device and as such appears earlier in the close microphone audio signal recording. If can be furthermore seen that if we were to time align the signals directly, an erroneous time difference may be estimated using the signals from the disturbing audio source signals which have a time difference Δt2 713.

It would be seen that in order to remove the influence of the disturbance, the disturbance is to be removed from both audio signals before an alignment operation is performed. The times of the disturbance in the spatial capture device (OZO) microphone signal are known based on the steps explained above. In other words determining temporal segments to be excluded from alignment using the positional estimation of the close microphone and the disturbing audio source.

Figure 13:
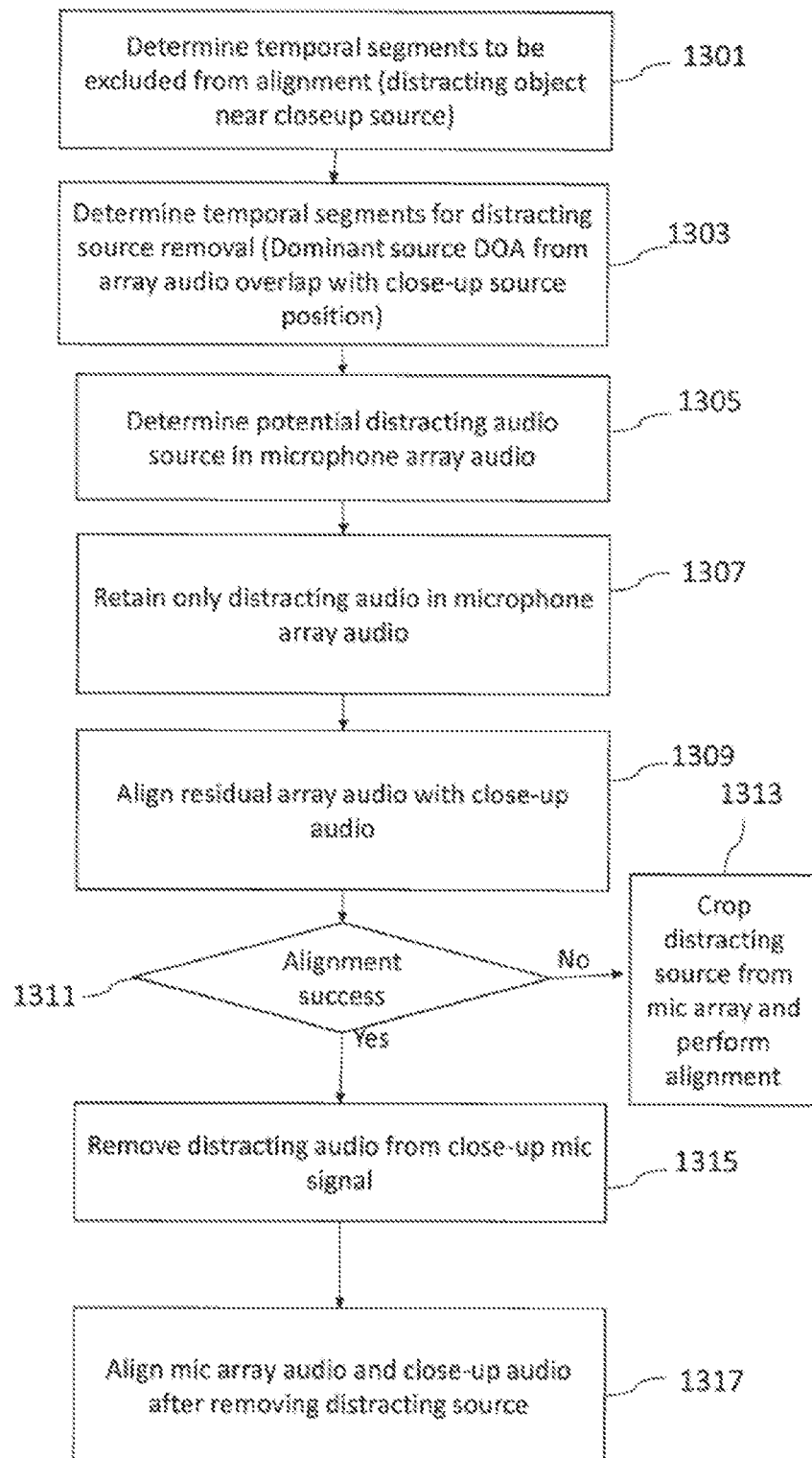
FIG. 13 shows a flow diagram of the method of alignment according to some embodiments.

The operation of determining the temporal segments to be excluded from alignment with respect to the spatial capture device is shown in FIG. 13 by step 1301.

Furthermore the system may be configured to determine temporal segments for distracting source removal by comparing the dominant source direction of arrival from the array audio overlap with the close microphone source position.

The operation of determining the temporal segments for distracting source removal by comparing the dominant source direction of arrival from the array audio overlap with the close microphone source position is shown in FIG. 13 by step 1303.

However, times of the disturbance in the close-up mic are not known.

The first step is to crop everything out from the spatial capture device (OZO) microphone signal except the disturbance part.

In order to implement this the temporal segments where there are potential distracting audio sources in the spatial capture device microphone audio signal are determined.

The operation of determining the potential distracting audio source component within the spatial capture device microphone audio signal is shown in FIG. 13 by step 1305.

The potential distracting audio source component 721 is shown in FIG. 8 being cropped from the spatial capture device microphone array audio signal 701.

The operation of retaining only the distracting audio in microphone array audio (cropping) is shown in FIG. 13 by step 1307.

The disturbance part is then aligned to the close-up mic signal. This may be implemented using GCC-PHAT. This is shown in FIG. 8 where the alignment time difference 811 between the cropped 811 part of the spatial capture device microphone array audio signals and the similar 813 part of the close microphone audio signal is shown.

This alignment time difference may be applied to the close microphone audio signal 703 to produce the 'disturbance' aligned 903 close microphone audio signal where the disturbances are aligned 911.

The operation of aligning the residual (disturbance only) spatial capture device microphone array audio signal with the close microphone audio signal is shown in FIG. 13 by step 1309.

Figure 10:
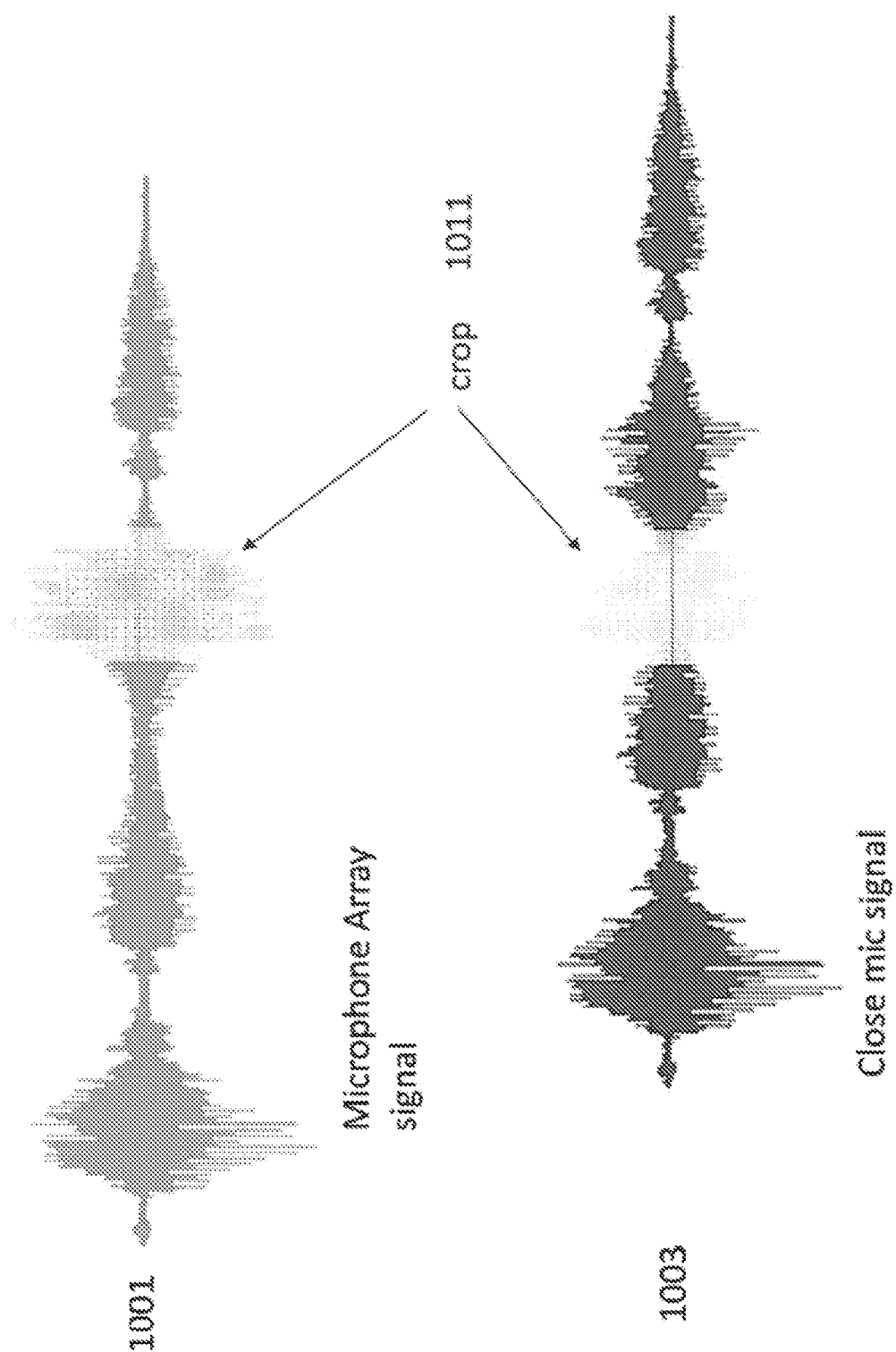
FIG. 10 shows an example of audio signal traces from close microphone and spatial capture devices where an interfering audio source component is cropped from the audio signals following the alignment of the interfering source in FIG. 9.

Having aligned the residual (disturbance only) spatial capture device microphone array audio signal with the close microphone audio signal the disturbance may be cropped from the close microphone audio signal and also from the spatial capture device microphone array audio signal. This is shown in FIG. 10 by the cropped segment 1011 containing the disturbance only part of the spatial capture device microphone array audio signal which when removed from the spatial capture device microphone array audio signal generates a non-disturbance spatial capture device microphone array audio signal 1001. Also shown in FIG. 10 is the cropped segment 1011 containing the disturbance only part of the close microphone audio signal which when removed from the close microphone audio signal generates a non-disturbance close microphone audio signal 1003.

The operation of determining whether the disturbance only alignment was a success is shown in FIG. 13 by step 1311.

Where the disturbance only alignment fails then the cropping of only the spatial capture device microphone array audio signal is performed and then the alignment is carried out on the uncropped close microphone audio signal and the cropped spatial capture device microphone array audio signal.

The operation of aligning the uncropped close microphone audio signal and the cropped spatial capture device microphone array audio signal is shown in FIG. 13 by step 1313.

However when the disturbance only alignment is a success then the cropping of both of the audio signals is performed.

The operation of removing the distracting audio from the close microphone signal (as well as removing the distracting audio from the spatial capture device microphone array audio signal) is shown in FIG. 1315.

Figure 11:
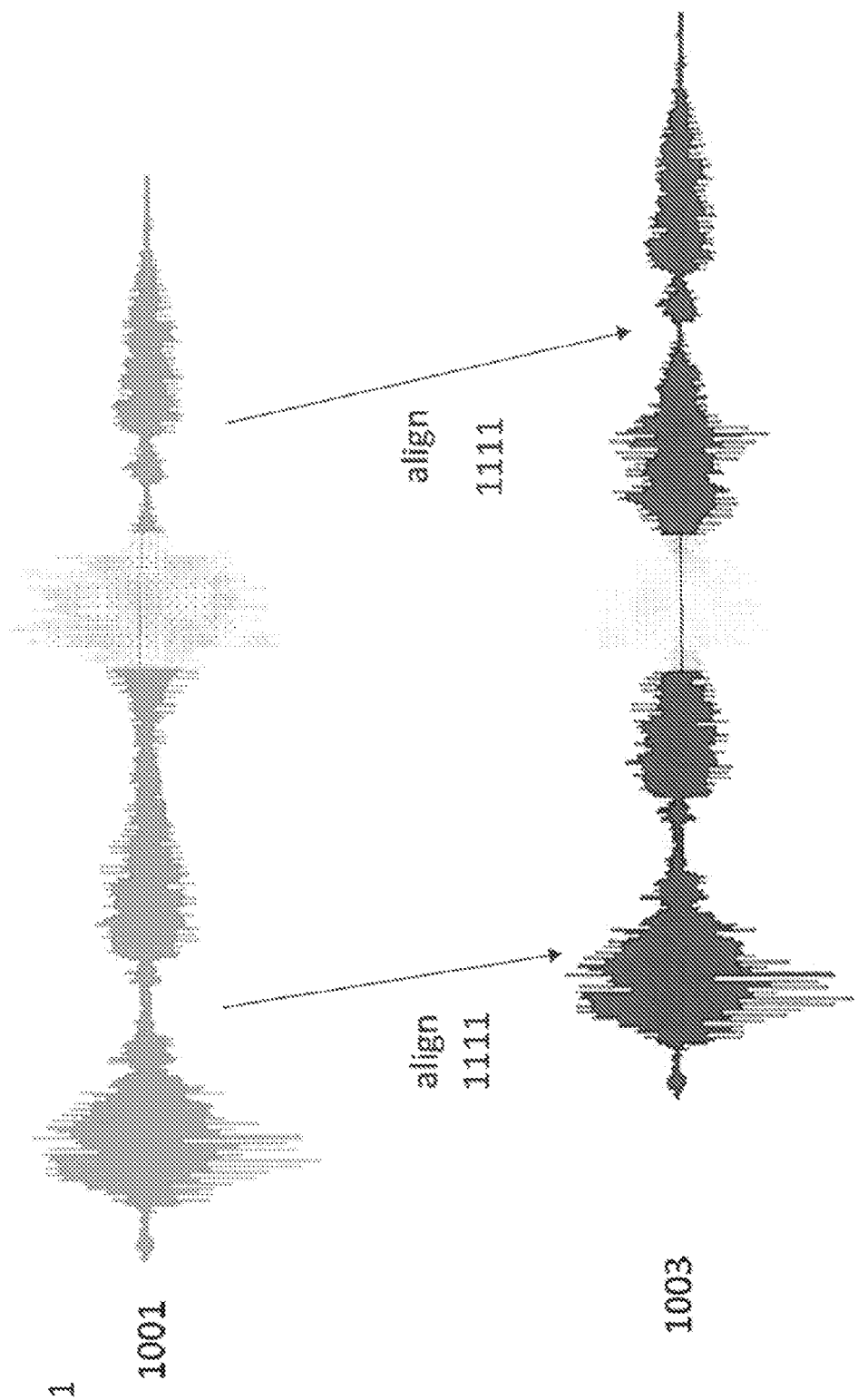
FIG. 11 shows an example of audio signal traces from close microphone and spatial capture devices where an audio source is aligned after the cropping of the interfering audio source component shown in FIG. 10.
Figure 12:
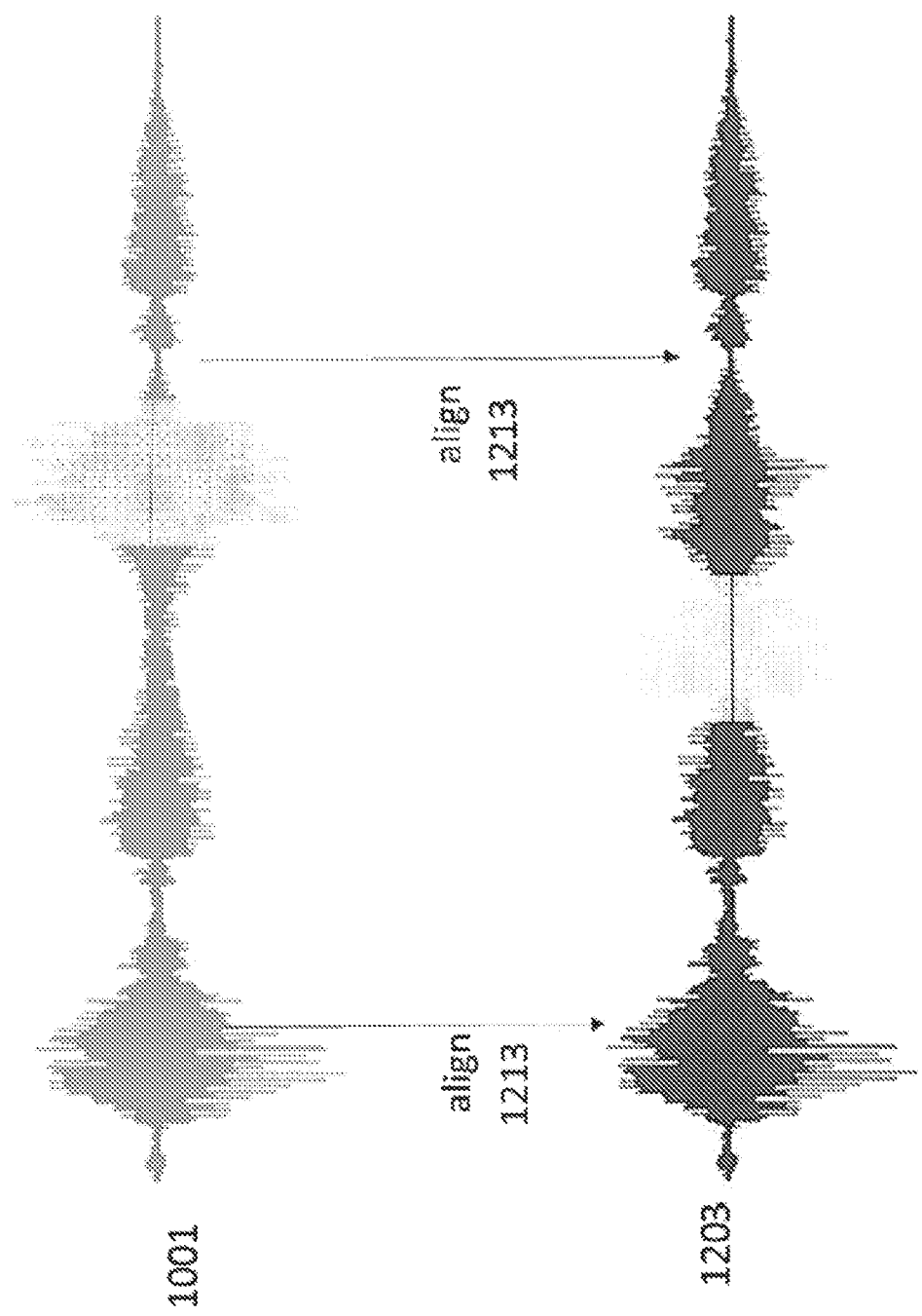
FIG. 12 shows an example of audio signal traces from close microphone and spatial capture devices following the alignment shown in FIG. 11.

FIG. 11 shows where the determination of the alignment may be implemented using GCC-PHAT. This is shown in FIG. 11 where the alignment time difference 1111 between the cropped spatial capture device microphone array audio signals 1001 and the cropped close microphone audio signal 1003 is shown.

This alignment time difference may be applied to the cropped close microphone audio signal 1003 to align 1213 the audio signals and produce the aligned close microphone audio signal 1203.

The operation of aligning the cropped spatial capture device microphone array audio signal with the close microphone audio signal is shown in FIG. 13 by step 1317.

The microphones may be transducers configured to convert acoustic waves into suitable electrical audio signals. In some embodiments the microphones can be solid state microphones. In other words the microphones may be capable of capturing audio signals and outputting a suitable digital format signal. In some other embodiments the microphones or microphone array can comprise any suitable microphone or audio capture means, for example a condenser microphone, capacitor microphone, electrostatic microphone, Electret condenser microphone, dynamic microphone, ribbon microphone, carbon microphone, piezoelectric microphone, or microelectrical-mechanical system (MEMS) microphone.

The processor can be configured to execute various program codes. The implemented program codes can comprise audio signal processing such as described herein.

In some embodiments the device comprises a memory. In some embodiments the at least one processor is coupled to the memory. The memory can be any suitable storage means. In some embodiments the memory comprises a program code section for storing program codes implementable upon the processor. Furthermore in some embodiments the memory can further comprise a stored data section for storing data, for example data that has been processed or to be processed in accordance with the embodiments as described herein. The implemented program code stored within the program code section and the data stored within the stored data section can be retrieved by the processor whenever needed via the memory-processor coupling. The device may comprise a transceiver coupled to the processor and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver or transceiver means can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the electronic device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. Apparatus comprising a processor configured to:
   receive an audio signal from a close microphone, wherein the audio signal is input in a spatial audio mixing, and where the close microphone is associated with a first sound source of a sound scene;
   receive a beam-formed audio signal from a microphone array, wherein the beam-formed audio signal is a result of forming a beam of the microphone array directed from the microphone array towards the close microphone so as to enhance the audio signal;
   determine a time duration where no further sound source is active within the sound scene; and
   determine a time difference, during the time duration, between the audio signal and the beam-formed audio signal to enable alignment of the audio signal and the beam-formed audio signal.

2. The apparatus as claimed in claim 1, wherein the processor configured to receive the beam-formed audio signal from the microphone array is configured to:
 determine an orientation angle from the microphone array to the close microphone; and
 generate the beam-formed audio signal based on the determined orientation angle.

3. The apparatus as claimed in claim 2, wherein the processor is configured to determine the orientation angle from the microphone array to the close microphone based on at least one of:
 a satellite positioning system estimate of position of the close microphone and/or the microphone array;
 an inertial positioning system estimate of position of the close microphone and/or the microphone array;
 a radio frequency beacon system estimate of position of the close microphone and/or the microphone array;
 a high accuracy indoor positioning (HAIP) system estimate of position of a positioning (HAIP) tag associated with the close microphone and/or the microphone array; or
 a visual object tracking system estimate of position of an object associated with the close microphone and/or the microphone array.

4. The apparatus as claimed in claim 2, wherein the processor configured to generate the beam-formed audio signal is further configured to adaptively change a beam width for the beam-formed audio signal.

5. The apparatus as claimed in claim 4, wherein the processor, configured to adaptively change the beam width for the beam-formed audio signal, is configured to adaptively change the beam width for the beam-formed audio signal based on at least one of:
 an amplitude of the close microphone audio signal;
 an amplitude of the microphone array audio signal;
 a position of the sound source; or
 a variance of a position of the close microphone.

6. The apparatus as claimed in claim 1, wherein the processor, configured to determine the time duration where no further sound source is active within the sound scene, is configured to at least one of:
 determine the time duration where there is an absence of the further sound source within an audio scene comprising the first sound source;
 determine at least one further sound source within an audio scene comprising the first sound source;
 determine a position of the at least one further sound source; or
 determine, for the time duration, the position of the at least one further sound source is not between the microphone array and the first sound source.

7. The apparatus as claimed in claim 1, wherein the processor configured to determine the time difference, during the time duration, between the audio signal and the beam-formed audio signal is further configured to remove segments from the audio signal and/or the beam-formed audio signal based on a determination, for a second time duration of the beam-formed audio signal from microphone array, of a presence of at least one further sound source within the beam-formed audio signal.

8. The apparatus as claimed in claim 7, wherein the processor, configured to selectively remove segments from the audio signal and the beam-formed audio signal, is configured to:
 determine the second time duration;
 determine a further sound source time difference between the beam-formed audio signal and the audio signal by identifying within the audio signal the presence of the at least one further sound source matching the presence during the second time duration of the beam-formed audio signal;
 remove the time segment associated with the second time duration from the beam-formed audio signal; and
 remove the time segment associated with the second time duration adjusted by the further sound source time difference from the audio signal.

9. The apparatus as claimed in claim 6, wherein the processor, configured to determine the time duration where no further sound source is active within the sound scene, array and the close is configured to perform at least one of:
 visually determine a presence of the further sound source;
 determine the presence the further source based on a position estimate from a positioning system associated with the further sound source; or
 determine the presence of the further sound source by determining an orientation of the close microphone from the microphone array, based on directional analysis of the beam-formed audio signal, differs significantly from an expected orientation of the close microphone from the microphone from an estimate of the position of the close microphone.

10. The apparatus as claimed in claim 1, wherein the processor is further configured to mix and/or process the audio signal based on the time difference to align the audio signal and the beam-formed audio signal.

11. A method comprising:
 receiving an audio signal from a close microphone, wherein the audio signal is input in a spatial audio mixing, and the close microphone is associated with a first sound source of a sound scene;
 receiving a beam-formed audio signal from a microphone array, wherein the beam-formed audio signal is a result of forming a beam of the microphone array directed from the microphone array towards the close microphone so as to enhance the audio signal;
 determining a time duration where no further sound source is active within the sound scene; and
 determining a time difference, during the time duration, between the audio signal and the beam-formed audio signal to enable alignment of the audio signal and the beam-formed audio signal.

12. The method as claimed in claim 11, wherein receiving the beam-formed audio signal from the microphone array comprises:
 determining an orientation angle from the microphone array to the close microphone; and
 generating the beam-formed audio signal based on the determined orientation angle.

13. The method as claimed in claim 12, wherein determining the orientation angle from the microphone array to the close microphone comprises at least one of:
 determining a satellite positioning system estimate of position of the close microphone and/or the microphone array;
 determining an inertial positioning system estimate of position of the close microphone and/or the microphone array;
 determining a radio frequency beacon system estimate of position of the close microphone and/or the microphone array;
 determining a high accuracy indoor positioning (HAIP) system estimate of position of a positioning (HAIP) tag associated with the close microphone and/or the microphone array; or determining a visual object tracking system estimate of position of an object associated with the close microphone and/or the microphone array.

14. The method as claimed in claim 12, wherein generating the beam-formed audio signal further comprises adaptively changing a beam width for the beam-formed audio signal.

15. The method as claimed in claim 14, wherein adaptively changing the beam width for the beam-formed audio signal comprises adaptively changing the beam width for the beam-formed audio signal based on at least one of:
   an amplitude of the close microphone audio signal;
   an amplitude of the microphone array audio signal;
   a position of the sound source; or
   a variance of a position of the close microphone.

16. The method as claimed in claim 11, wherein determining the time duration where no further sound source is active within the sound scene array and the close microphone comprises at least one of:
   determining the time duration where there is an absence of the further sound source within the sound scene comprising the first sound source;
   determining at least one further sound source within the sound scene comprising the first sound source;
   determining a position of the at least one further sound source; or
   determining, for the time duration, that the position of the at least one further sound source is not between the microphone array and the first sound source.

17. The method as claimed in claim 11, wherein determining the time difference, during the time duration, between the audio signal and the beam-formed audio signal comprises removing segments from the audio signal and/or the beam-formed audio signal based on a determination, for a second time duration of the beam-formed audio signal from microphone array, of a presence of at least one further sound source within the beam-formed audio signal.

18. The method as claimed in claim 17, wherein selectively removing segments from the audio signal and the beam-formed audio signal comprises:
   determining the second time duration;
   determining a further sound source time difference between the beam-formed audio signal and the audio signal by identifying within the audio signal the presence of the at least one further sound source matching the presence during the second time duration of the beam-formed audio signal;
   removing the time segment associated with the second time duration from the beam-formed audio signal; and
   removing the time segment associated with the second time duration adjusted by the further sound source time difference from the audio signal.

19. The method as claimed in claim 16, wherein determining the time duration where no further sound source is active within the sound scene array and the close microphone comprises at least one of:
   visually determining a presence of the further sound source;
   determining the presence of the at least one further sound source based on a position estimate from a positioning system associated with the further sound source; or
   determining the presence of the further sound source by determining an orientation of the close microphone from the microphone array, based on directional analysis of the beam-formed audio signal, differs significantly from an excepted orientation of the close microphone from the microphone array from an estimate of the position of the close microphone.

20. The method as claimed in claim 11, further comprising mixing and/or processing the audio signal based on the time difference to align the audio signal and the beam-formed audio signal.

* * * * *

UNITED STATES PATENT AND TRADEMARK OFFICE
CERTIFICATE OF CORRECTION

PATENT NO. : 10,785,565 B2  Page 1 of 1
APPLICATION NO. : 16/461030
DATED : September 22, 2020
INVENTOR(S) : Sujeet Shyamsundar Mate and Jussi Leppanen It is certified that error appears in the above-identified patent and that said Letters Patent is hereby corrected as shown below:

In the Claims

In Claim 6:
Column 17, Lines 43-44, "an audio scene comprising the first sound source" should be deleted and --the sound scene-- should be inserted.
Column 17, Lines 45-46, "an audio scene comprising the first sound source" should be deleted and --the sound scene-- should be inserted.
Column 17, Line 49, "the position" should be deleted and --that the position-- should be inserted.

In Claim 9:
Column 18, Line 13, "array and the close" should be deleted.
Column 18, Line 23, "microphone from" should be deleted and --microphone array from-- should be inserted.

In Claim 16:
Column 19, Lines 18-19, "array and the close microphone" should be deleted.

In Claim 19:
Column 20, Lines 19-20, "array and the close microphone" should be deleted.
Column 20, Line 30, "excepted" should be deleted and --expected-- should be inserted.

Signed and Sealed this
Twenty-seventh Day of October, 2020

Andrei Iancu
*Director of the United States Patent and Trademark Office*